Figure 1:
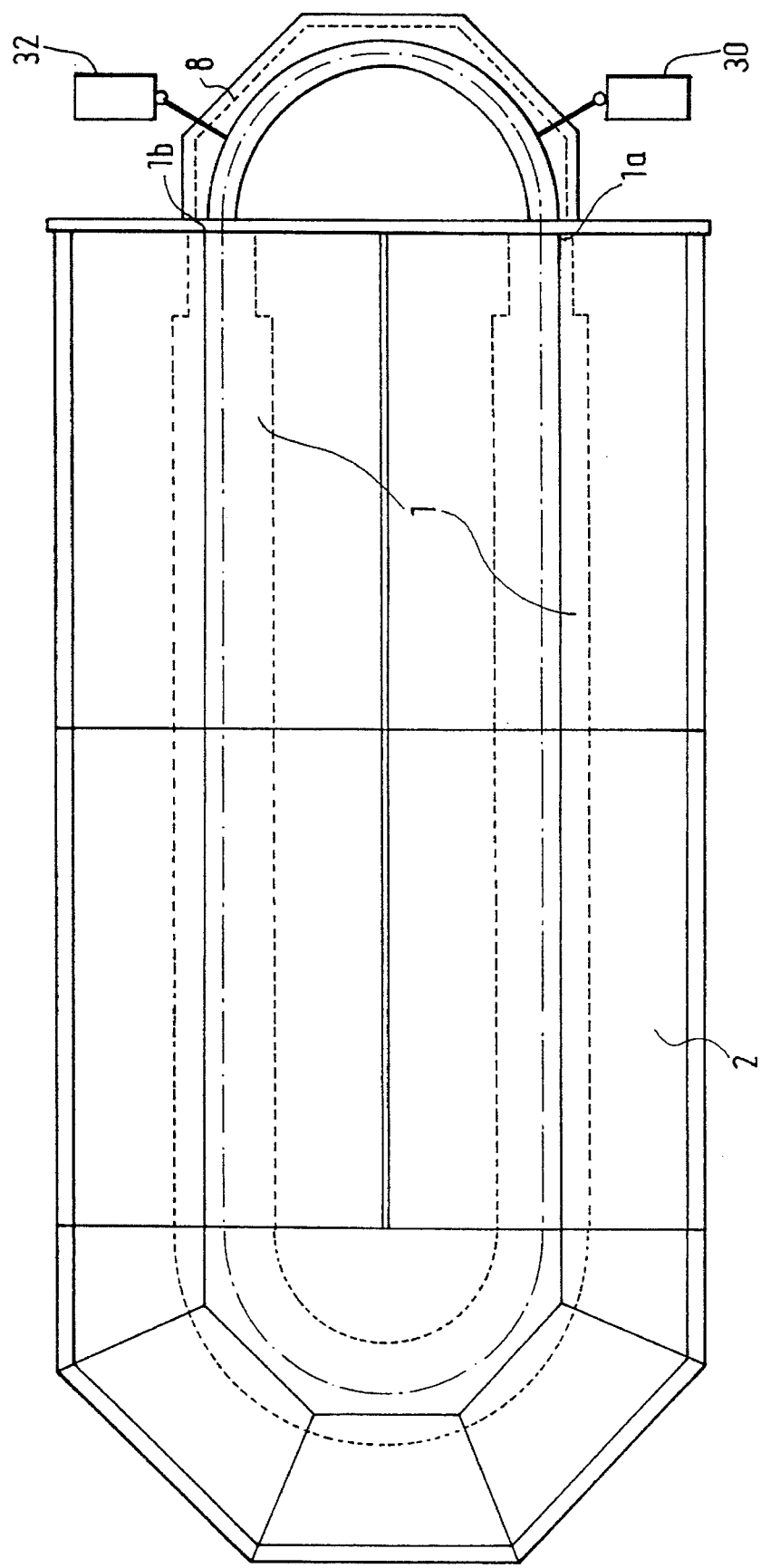

United States Patent [19]
Geismar

[11] Patent Number: 5,472,343
[45] Date of Patent: Dec. 5, 1995

[54] KILN FOR THE PRODUCTION OF CERAMIC PRODUCTS AND PROCESS FOR THE OPERATION OF THE KILN

[75] Inventor: Bernd Geismar, Berlin, Germany

[73] Assignee: Kerabedarf Keramik Engineering GmbH, Berlin, Germany

[21] Appl. No.: 242,144

[22] Filed: May 13, 1994

Related U.S. Application Data

[63] Continuation of Ser. No. 937,956, Aug. 28, 1992, abandoned.

[30] Foreign Application Priority Data

Sep. 11, 1991 [DE] Germany ............... 41 30 598.1

[51] Int. Cl.[6] ...................................... F27B 9/14
[52] U.S. Cl. .................. 432/124; 432/125; 432/126; 432/141; 432/162; 432/184; 432/224; 432/243
[58] Field of Search ...................... 432/124, 125, 432/126, 141, 162, 184, 224, 243

[56] References Cited

U.S. PATENT DOCUMENTS

| | | | |
|---|---|---|---|
| 3,740,868 | 6/1973 | Moore et al. | 34/105 |
| 4,052,152 | 10/1977 | Whelan et al. | 432/124 |
| 4,142,304 | 3/1979 | Ricci et al. | 34/105 |
| 4,487,578 | 12/1984 | Wakino et al. | 432/243 |
| 4,619,607 | 10/1986 | Schroder | 432/162 |
| 4,721,836 | 1/1988 | Zeisse et al. | 219/10.67 |
| 4,834,649 | 5/1989 | Levit et al. | 432/162 |
| 4,998,779 | 3/1991 | Kigyos | 432/124 |
| 5,066,223 | 11/1991 | Mosch | 432/184 |

Primary Examiner—Henry A. Bennett
Assistant Examiner—Siddharth Ohri
Attorney, Agent, or Firm—Marshall & Melhorn

[57] ABSTRACT

A kiln or oven for producing ceramic products is described having a combustion chamber through which the ceramic products continuously pass, as well as a process for the operation and control of the kiln and the ceramic products perform a rotation about their own longitudinal axis in addition to the passage movement through the combusion chamber. The passage and rotation of the ceramic products takes place by means of a drive mechanism located in the kiln base with shafts projecting into the combustion chamber and located on an inventively designed receiving and holding device and can be regulated in infinitely variable and separate manner. The invention permits an effective, discontinuous operation of the kiln.

7 Claims, 5 Drawing Sheets

KILN FOR THE PRODUCTION OF CERAMIC PRODUCTS AND PROCESS FOR THE OPERATION OF THE KILN

This application is a continuation of application Ser. No. 07/937,956, filed Aug. 28, 1992, now abandoned.

The invention relates to an oven or kiln for producing ceramic products from fine ceramics or porcelain in a continuous process, in which the ceramic products to be fired pass in controlled manner through the kiln by means of a reception and holding device according to the invention, as well as a process for operating the kiln.

It is known to fire fine ceramic products in so-called tunnel kilns. The conventional tunnel kiln comprises a lined channel with a length of approximately 30 to 100 m and a width of 0.3 to 1.2 m. The product is passed continuously through the kiln on lined firing trucks, the product being located on the truck in shelves.

The disadvantages of such tunnel kilns are the considerable inertia thereof, which only allows to a limited extent variations as regards capacity and temperature curve and which requires continuous operation over months and years, together with the high specific energy consumption due to the large amount of fuel aids compared with the quantity of the actual product and a long firing time due to the compact setting structure. There is also only a limited automation possibility with respect to the loading and unloading of the firing trucks due to the shelf means.

The prior art also discloses rapid firing kilns, which are smaller than tunnel kilns, have a flat cross-section and in which there are no shelf means, because the product on the firing truck is only set in one layer.

The disadvantage of such rapid firing kilns is that they also require a firing truck and the firing aids are subject to high wear due to the constant, rapid temperature changes. In addition, the regulation of such kilns is very sensitive and they are highly sensitive to temperature differences in the combustion chamber. These kilns have a low specific capacity due to the small kiln cross-section and, as with tunnel kilns, continuous operation is necessary.

Furthermore, in connection with the production of tiles, so-called roller kilns or ovens are known, which require setting plates made from a ceramic material as the carrier medium in the production of e.g. household china. It is disadvantageous with respect to such roller kilns that they have a very sensitive regulation, a low specific capacity due to the small kiln cross-section, they are sensitive to temperature differences in the combustion chamber, continuous operation is required, there is considerable wear to the setting plates due to the constant, rapid temperature changes and high maintenance costs occur with respect to the rollers and roller drive.

All the known solutions suffer from the common disadvantage that the carrier media for the ceramic products to be fired have a relatively large mass and must also be heated. This leads to high time losses and high energy costs for the production of the ceramic products. The carrier media are also subject to significant wear, which has a disadvantageous influence on the production costs.

Attempts to increase the width of the kilns and therefore increase the throughput per unit of time have led to problems in the temperature distribution in the kiln and ultimately to quality differences in the fired ceramic products.

Another disadvantage of the known kilns is that as a result of their size and therefore inertia they can only be economically operated on a continuous basis, i.e. in three shifts over a long period of time. However, this leads to enormous personnel costs.

On the basis of the aforementioned disadvantages, the problem of the invention is to provide a kiln for ceramic products and a process for the operation of the kiln, in which economic, discontinuous kiln operation is possible and therefore a minimization of personnel costs, whilst no expensive carrier media are required for receiving the ceramic products and the process for operating and controlling the kiln ensures a high throughput of ceramic products per unit of time with a constant, high product quality.

This problem is solved by the characterizing features of claim 1, in conjunction with the features of the preambles, as well as appropriate features of the associated subclaims.

The kiln for producing ceramic products according to the invention proposed for solving the set problem has a U-shaped combustion chamber or firebox and a kiln base or bottom, the combustion chamber and base of the kiln being connected by a channel. In the latter are provided rotary shafts, which in the combustion chamber have a reception and holding device for the ceramic products. In the base of the kiln said shafts are driven by a chain drive in such a way that the ceramic products located on the reception and holding device pass through the kiln combustion chamber.

Simultaneously to the passage according to the inventive kiln operating process, a further drive rotates the shaft and therefore the ceramic products in the combustion chamber.

The drives for the passage and rotation are regulatable independently of one another with respect to the rotation direction, passage speed and rotary speed.

The temperature-based sealing of the combustion chamber with respect to the kiln base takes place by means of a pressure compensation control.

The invention permits an effective discontinuous operation of the kiln and ensures a high, constant quality of the ceramic products produced.

The invention is described in greater detail hereinafter relative to nonlimitative embodiments and the attached drawings, wherein show:

FIG. 1 A plan view of the kiln according to the invention with the loading and removal unit.

Figure 2A:
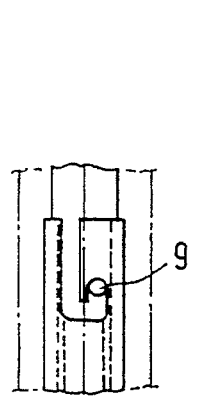
Figure 2:
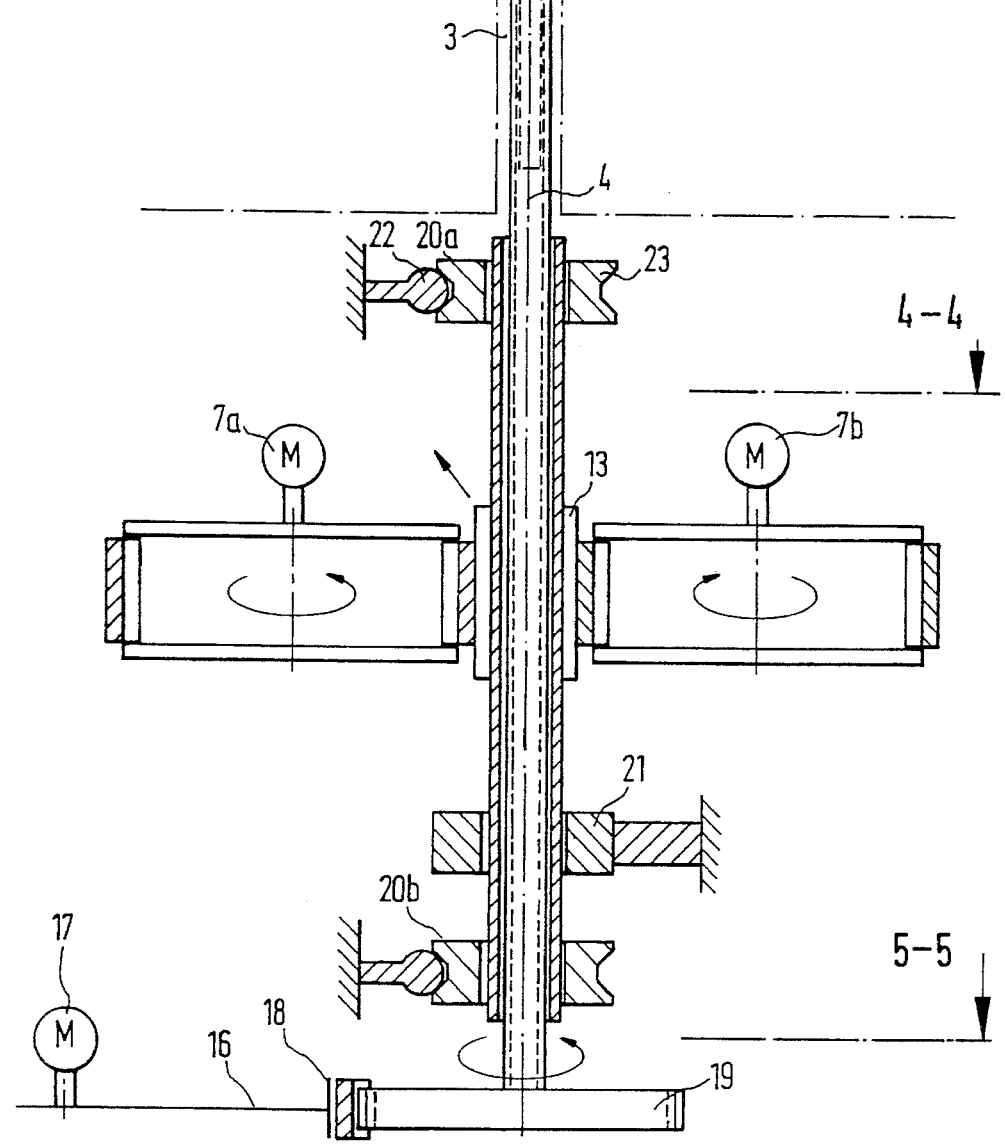

FIG. 2 A section through the inventive kiln showing the drive for the passage and rotation of the ceramic products.

FIG. 2A enlarged view of a portion of the kiln illustrated in FIG. 2.

Figure 3:
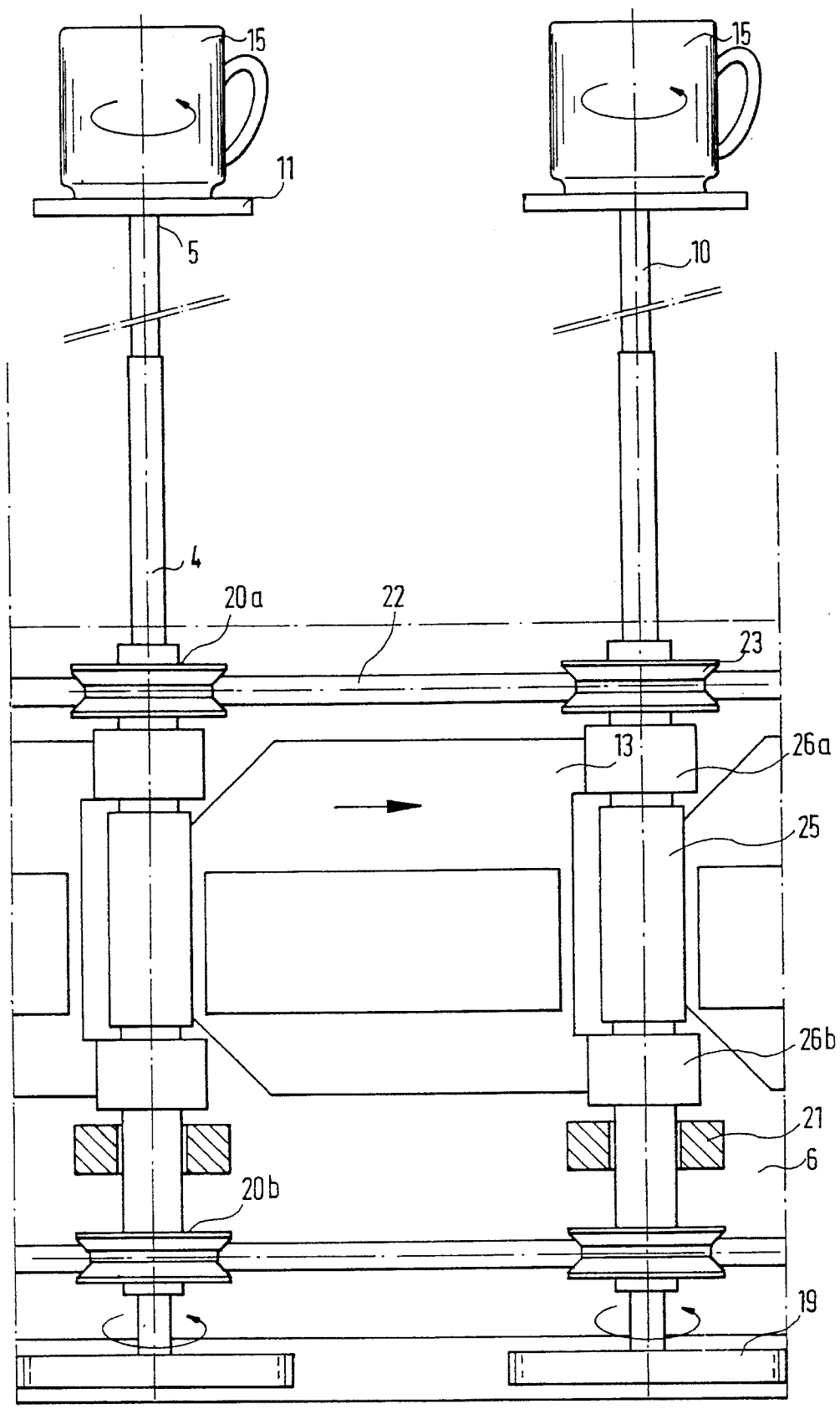

FIG. 3 A detail view of the chain drive for carrying out the passage through the inventive kiln and for mounting the shafts.

Figure 4:
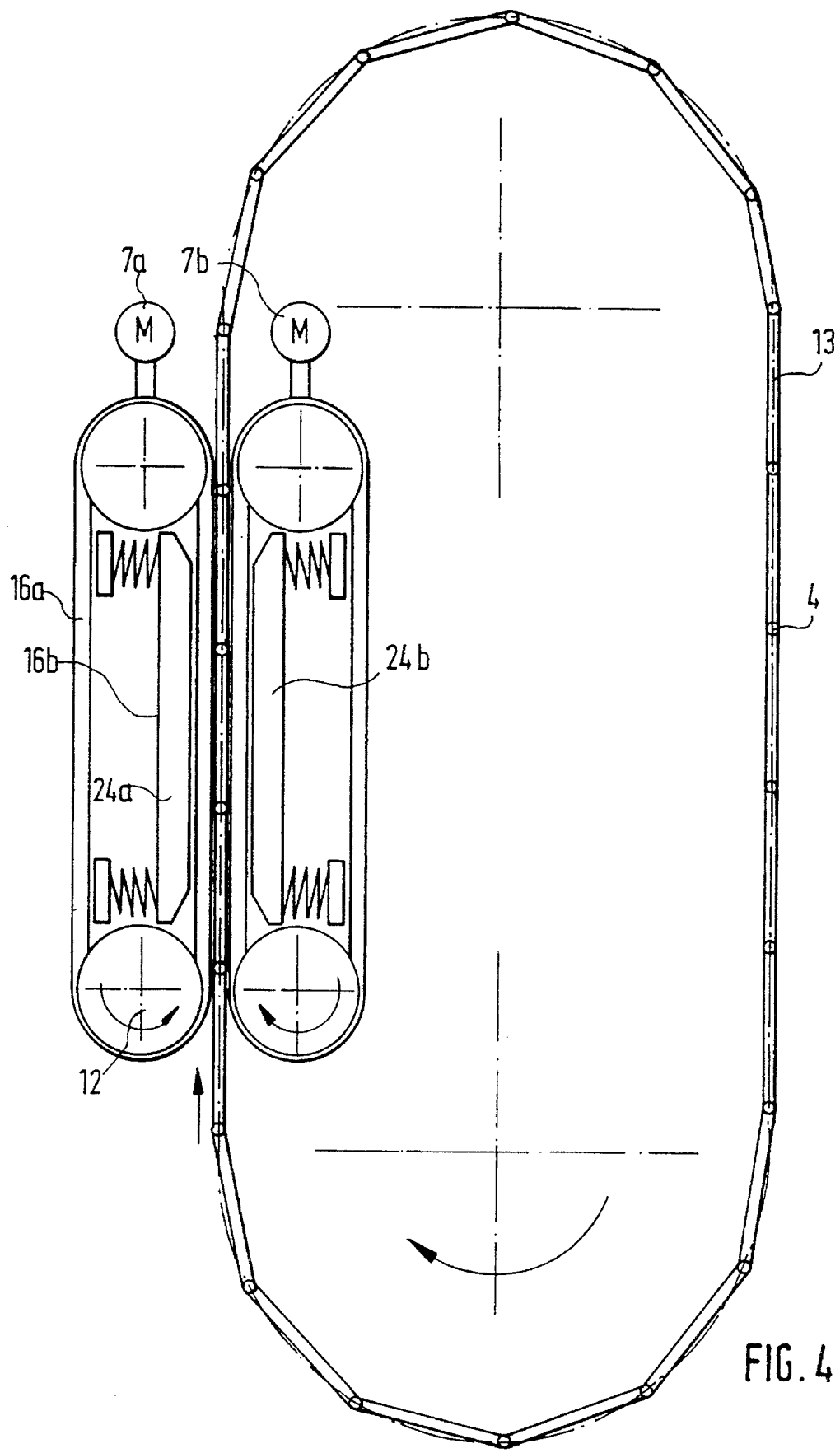

FIG. 4 A plan view of the chain drive in sectional representation.

Figure 5:
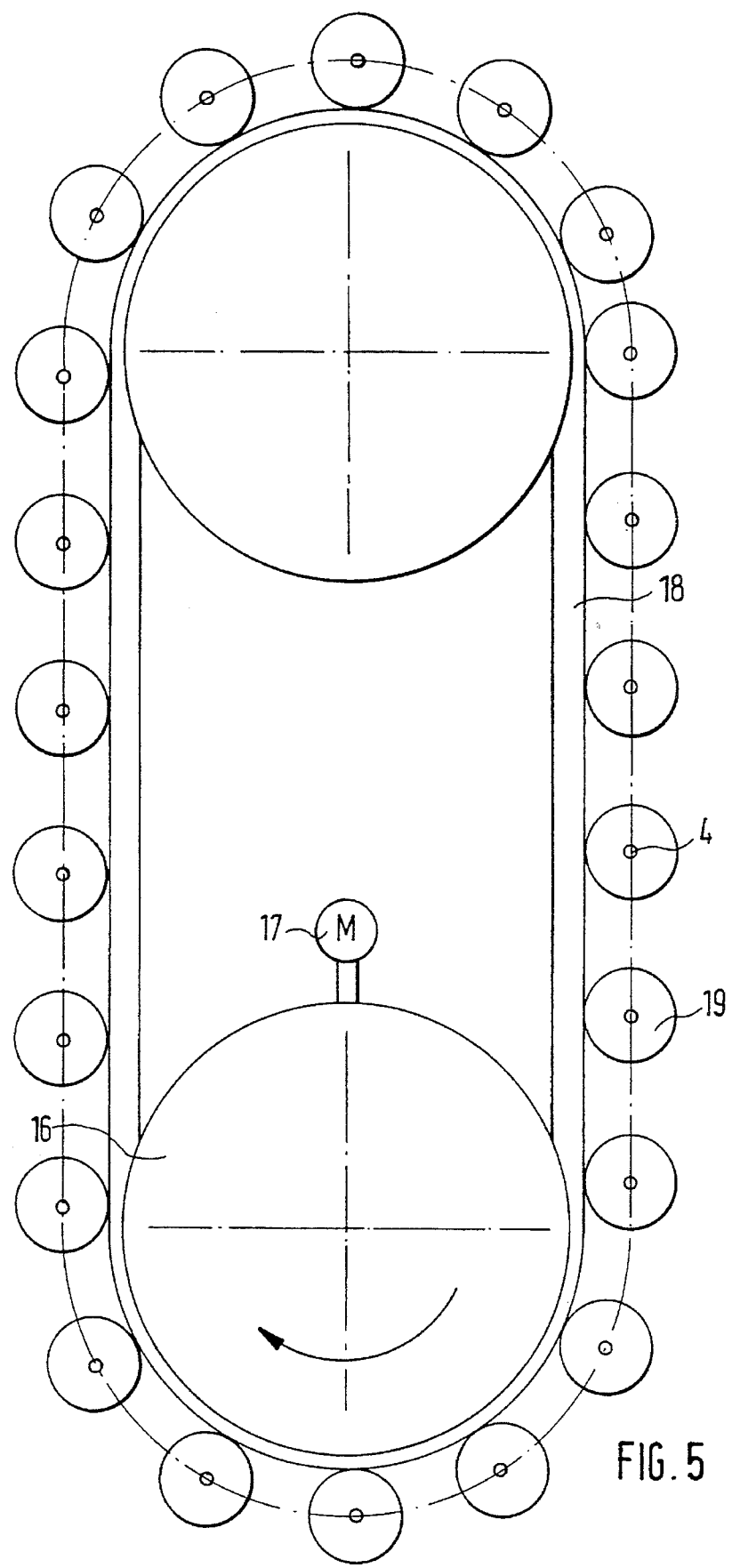

FIG. 5 A plan view of the rotary drive in sectional representation.

A shown in FIG. 1, the kiln or oven 2 has a U-shaped firebox or combustion chamber 1 through which pass the ceramic products 15 and are thereby fired.

The combustion chamber 1 has a combustion chamber inlet 1a and a combustion chamber outlet 1b. At the combustion chamber inlet 1a and outlet 1b is provided a loading and removal unit by means of which the kiln 1 is loaded with the as yet unfired ceramic products 15 and by means of which the fired ceramic products 15 are removed after passing through the kiln 2. The loading and removal can take place both automatically and manually.

For automatic loading and removal it is appropriate to use industrial robots, which are correspondingly programmed. This offers the possibility of setting up an automatic production line from the automatic production machines to the packaging stage.

FIG. 2 shows a section through the inventive kiln 2 showing the drive for the passage and rotation of the ceramic products 15. By means of a flange 10 the reception and holding device 5 on which is located the ceramic product 15 to be fired, in the present embodiment a cup, projects into the combustion chamber 1.

The reception and holding device 5 is constructed as a rotary table 11, which is detachably connected by means of the flange 10 and using a bayonet catch 9 to the shaft 4. The lower part of the flange 10 with the bayonet catch 9 and the upper part of the shaft 4 are located in a channel 3, which connects the base 6 of the kiln to the combustion chamber 1.

In place of the rotary table 11 the reception and holding device 5 can have at least three metal rods or tubes (not shown in the drawing), which are arranged in upwardly inclined manner on the flange 10. The metal rods or tubes normally have an upward inclination of approximately 2°.

Such a construction minimizes the weight and volume of the reception and holding device 5 and is used for centring as well as receiving and holding the ceramic products 15.

The diameter of the reception and holding device 5, i.e. the rotary table 11 or the construction formed from the metal tubes or rods, is adapted to the size of the ceramic products 15 to be fired.

Due to the fact that the reception and holding device 5 is detachably connected to the shaft 4 by means of the bayonet catch 9, it is possible to carry out a rapid replacement of the reception and holding device 5 as a function of the size of the ceramic products 15 to be fired.

The reception and holding device 5 and optionally also the flange 10 with the bayonet catch 9 are made completely or at least partly from a high temperature-resistant and thermal shock-resistant metal alloy. In the present embodiment said metal alloy has the following chemical-metallurgical composition:
Cr 20%, Al 5.5%, Ti 0.5%, $Y_2O_2$ 0.5, Fe 73.5%.

The base 6 of the kiln 2 contains the drives 7a and 7b for bringing about the passage of the ceramic products 15 through the combustion chamber 1, together with the drive 17 for rotating the ceramic products 15 in the combustion chamber 1.

By means of rolls or pulleys 12, the drives 7a and 7b drive two continuous drive toothed belts 16a, 16b which, as can be gathered from FIG. 4, are pressed by means of spring-loaded pressure members 24a and 24b against the chain links 13 and by means of the frictional forces which occur move the chain links 13 in the longitudinal direction.

As can in particular be gathered from FIG. 3, the shafts 4 are bound in rotary manner in the tubular end pieces 25, 26a and 26b of the chain links 13, so that with the longitudinal movement of the chain links 13 the shaft 4 moves along the channel 3 and consequently, by means of the reception and holding device 5, the ceramic products 15 located thereon are moved through the combustion chamber 1 of the kiln 2.

The drives 7a and 7b are regulatable, so that as a function of the requirements of the kiln operation it is possible to adjust the passage of the ceramic products 15 through the combustion chamber 1. It is also possible to have a rotation direction reversal of the drives 7a, 7b and therefore the removal again of the ceramic products 15 introduced into the combustion chamber 1.

In order to carry out the rotary movement of the shaft 4 and therefore the reception and holding device 5 and the ceramic products 15 located thereon, a drive 17 is provided which, by means of a rotary disk 16 drives a rotary toothed belt 18, which engages in a pinion 19 located on the base of the shaft 4.

The drive 17 can also be regulated as regards speed and rotation direction, so that in accordance with the requirements of the kiln operation the rotation direction and rotation speed of the ceramic products 15 in the combustion chamber 1 can be adjusted.

The rotary toothed belt 18 has an external tooth system engaging in the pinion 19, so that even when the drive 17 is stationary through the longitudinal movement brought about by the drives 7a and 7b along the rotary toothed belt 18, there is a rotation of the ceramic products 15 in the combustion chamber 1. The cooperation of the rotary toothed belt 18 and the pinion 19 located on the shaft 14 is illustrated in FIG. 5.

The drives 7a, 7b and 17 are regulatable independently of one another and in infinitely variable manner, which permits a very variant-rich overall control of the firing process.

The shaft 4 is mounted in rotary manner by means of the bearings 20a, 20b and 21 in the base 6 of the kiln 2. The bearings 20a and 20b are formed from tubes 22 in conjunction with the wheels 23. In the present embodiment there are 22 shafts 4 and 22 chain links 13.

The process for the operation and control of the kiln 2 is based on the fact that the ceramic products 15 pass through the combustion chamber 1 by means of a reception and holding device 5 and rotate about their own longitudinal axis on the reception and holding device 5 in the combustion chamber 1.

The passage speed and rotary speed of the ceramic products 15 are separately regulatable in infinitely variable manner, which offers numerous possibilities with respect to the optimization of the firing process.

The thermal sealing of the base 6 of the kiln 2 with respect to the combustion chamber 1 via the channel 3 takes place by a pressure compensation and for bringing about the pressure compensation the pressure in the combustion chamber 1 and in the base 6 is measured and the differential pressure regulates the pressure compensation in such a way that an overpressure in the combustion chamber 1 and therefore an advance of heat into the base 6 are effectively prevented.

The loading of the kiln 2 with the ceramic products 15 and the removal thereof after the firing process at the loading and removal unit 8 takes place automatically through correspondingly programmed industrial robots, shown schematically at 30 and 32 in FIG. 1.

I claim:

1. Process for the operation of a kiln having a combustion chamber, mounted on a base, for producing ceramic products in continuous operation, said chamber provided with a bottom channel opening extending the full length of said chamber, said kiln including a drive means, mounted in said base, having a plurality of shafts in spaced-apart relationship, each shaft extending from the drive means in said base through the channel into said combustion chamber, comprising the steps of:

a) loading, at one end of said combustion chamber, ceramic products on a receptor and holding device and securing such a device to each shaft;

b) continuously driving said plurality of shafts along the channel in said combustion chamber for passing said ceramic products in a continuous manner through the combustion chamber in the longitudinal direction by means of a reception and holding device (5), while:

c) simultaneously and continuously rotating said plurality of shafts, together with the reception and holding devices and the ceramic products about longitudinal axis of said shafts;

d) regulating and varying the drive speed of said shafts and independently regulating and varying the rotary speed of said shafts to achieve the desired firing of said ceramic products; and e) removing the fired ceramic products from the reception and holding devices at the other end of said combustion chamber.

2. Process according to claim 1, including the additional step of measuring the pressure in the combustion chamber and in the base to regulate the pressure compensation in such a way that an overpressure in the combustion chamber and therefore an advance of heat into the base is prevented.

3. Process according to claim 1, characterized in that with a U-shaped combustion chamber, the loading and removal of the ceramic products occurs in proximate location at the open end of said combustion chamber.

4. Process according to claim 1, further comprising the step of thermally sealing said base relative to said combustion chamber by providing, during operation of said combustion chamber, a positive pressure in said base relative to said combustion chamber via said channel.

5. Process according to claim 1, wherein said shaft having a reception and holding device, together with the ceramic products, is rotated continuously about the longitudinal axis of said shaft while the ceramic products are being passed through the combustion chamber.

6. Process for the operation of a kiln for producing ceramic products in continuous operation, said kiln including a combustion chamber, a corresponding base, and a channel extending through the base and into the combustion chamber along the full length of the kiln, said base defining a cavity for mounting a looped drive means and a rotating means and including a plurality of shaft extending through the channel in said base into the combustion chamber, said process for operation of a kiln comprising the steps of:

a) positioning a product on a holding device;

b) securing the holding device to a chamber end of a shaft at an input end of the kiln;

b) engaging a drive means to said shaft;

c) engaging a rotating means to a base end of said shaft;

d) operating said drive means and driving said shaft through the cavity in said base such that the channel directs said shaft and passes the holding device and product through said combustion chamber;

e) simultaneously operating said rotating means and rotating said shaft such that the product is rotated on said shaft in said combustion chamber as the holding device and product pass through said combustion chamber on said shaft;

g) Independently and continuously regulating said drive means and said rotating means to control the speed and rotation of the product through said combustion chamber;

h) removing the holding device and product from said shaft at an output end of said kiln;

i) securing a second holding device and a second product on the chamber end of said shaft; and j) adjusting the speed of said drive means and said rotating means to achieve the desired firing of the second product.

7. Process for the operation of a kiln for producing ceramic products in continuous operation, said kiln including a combustion chamber, a corresponding base, and a channel extending through the base and into the combustion chamber along the full length of the kiln, said base defining a cavity for mounting a looped drive means and a rotating means and including a plurality of shaft extending through the channel in said base into the combustion chamber, said process for operation of a kiln comprising the steps of:

a) positioning a product on a holding device;

b) securing the holding device to a chamber end of a shaft at an input end of the kiln;

c) engaging a drive means to said shaft;

d) engaging a rotating means to a base end of said shaft;

e) providing a positive air pressure in the cavity of said base to thermally said base;

f) operating said drive means and driving said shaft through the cavity in said base such that the channel directs said shaft and passes the holding device and product through said combustion chamber;

g) regulating the positive air pressure as the product passes through said combustion chamber during operation of the kiln;

h) simultaneously operating said rotating means and rotating said shaft such that the product is rotated on said shaft in said combustion chamber as the holding device and product pass through said combustion chamber on said shaft;

i) removing the holding device and product from said shaft at an output end of said kiln;

j) securing a second holding device and a second product on the chamber end of said shaft; and k) adjusting the speed of said drive means and said rotating means to achieve the desired firing of the second product.

\* \* \* \* \*